April 15, 1969 J. C. MILLER ET AL 3,439,317
COORDINATE CONVERTER SYSTEM
Filed Dec. 20, 1967

INVENTORS
James C. Miller &
Charles M. Wine
BY H. Christoffersen
ATTORNEY

United States Patent Office 3,439,317

Patented Apr. 15, 1969

3,439,317

COORDINATE CONVERTER SYSTEM

James C. Miller, Pennington, and Charles M. Wine, Princeton, N.J., assignors to Radio Corporation of America, a corporation of Delaware Filed Dec. 20, 1967, Ser. No. 693,693

Int. Cl. G01s 9/66

U.S. Cl. 340—1 6 Claims

ABSTRACT OF THE DISCLOSURE

A coordinate converter system having a transducer apparatus operative to send and receive acoustic signals in a tablet medium. A distance measuring system translates the time between the transmission of the signals and the reception of reflected signals into a pair of counts representative of the X and Y coordinates of the transducer position on the tablet, respectively.

*Background of the invention*

The communication of data into a computer system has usually involved the use of typewriter-type input devices which enabled an operator to enter alphanumeric data through the manual operation of a keyboard. Recent attempts to enlarge the versatility communication link have produced so-called input "tablets" having a writing surface on which input data could be "written" and concurrently translated into input signals for the computer system. One such tablet apparatus uses a complex electronic translating structure with the writing instrument functioning as a pick-up element for radiated signals from a wire matrix imbedded in the surface of the tablet. The inherent complexity and high cost of such devices has limited the application of these devices as direct communication links. Accordingly, it is desirable to provide a tablet-type input device for translating input data into electrical signals and having a simple structure and mode of operation.

*Brief summary of the invention*

The illustrated embodiment of the present invention is a system for translating data written by an operator on a tablet-type input device into electrical signals using a writing device with a transducer apparatus for sending and receiving acoustic waves in the tablet medium. A distance measuring system is provided for translating the passage time of the acoustic waves into a set of X and Y coordinates. The measuring system includes first and second counters counting signals from a source of clock signals from the time of transmission of an acoustic wave in the tablet medium. The counting operations of the counters are successively terminated as reflected acoustic waves are received from the tablet boundaries along X and Y axes, respectively. The counters are reset for each new counting operation at a frequency which provides a desired sampling rate of the position of the transducer apparatus on the tablet.

*Detailed description of the invention*

Figure 1:
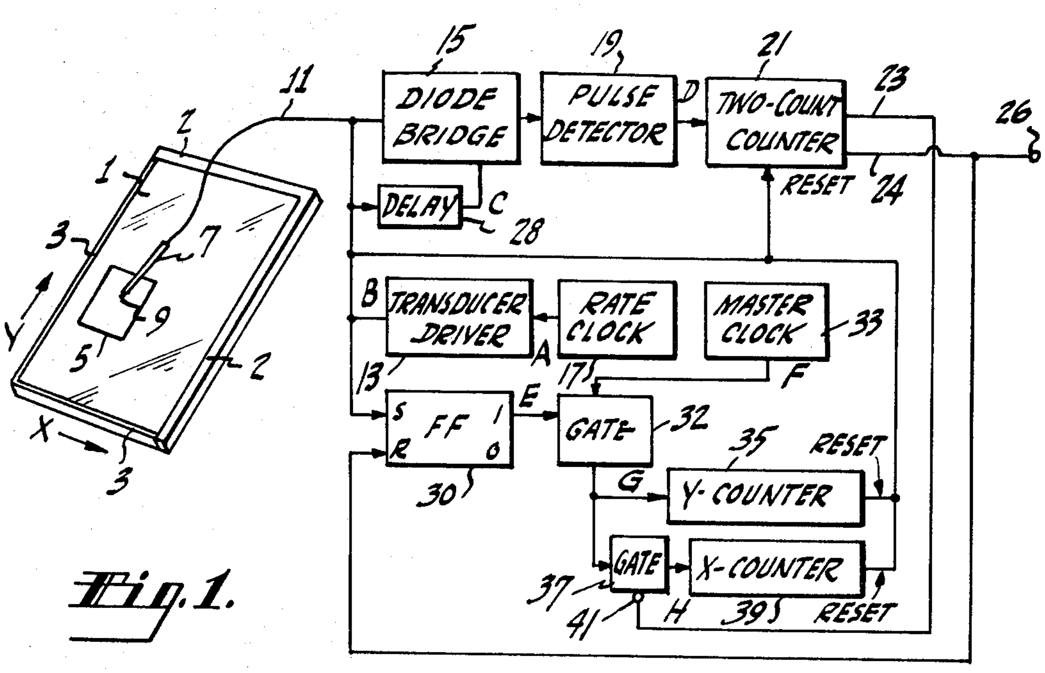
FIGURE 1 is a pictorial illustration of a coordinate converter system embodying the present invention.

Referring to FIGURE 1 in more detail, there is shown an embodiment of the present invention in a coordinate converter apparatus having an acoustic wave carrying tablet medium, e.g., glass, 1. A sound absorbing, or nonreflecting, layer 2 is attached to two adjacent edges of the tablet 1. The other edges of the tablet 1 are provided with a sound reflecting surface 3. A working area 5 is defined on the surface of the tablet 1 with the area 5 being spaced further from the sound absorbing edges 2 than from the sound reflecting edges 3. Further, area 5 is spaced in the illustrated X and Y directions in a particular orientation with respect to the sound reflecting edges 3 of the table 1. Specifically, referring to FIGURE 1, the area 5 is so located relative to the reflecting edges 3 that any point in area 5 is closer to the left-hand reflecting edge 3 than it is to the bottom reflecting edge 3.

A "pen" 7 is provided for manipulation by an operator for "writing" on the area 5. A transducer 9 is located at the writing end of the pen 7 to introduce acoustic waves in the medium of the tablet 1. The transducer 9 may be any suitable structure capable of translating an applied input signal to acoustic waves and of responding to reflected acoustic waves to produce an output signal, e.g., a piezoelectric crystal. In the illustrated embodiment, the sending and receiving transducer 9 is shown as one element, but it is obvious that separate transducers may be used. The transducer 9 and pen 7 are connected by a flexible signal carrying conduit 11, e.g., a wire cable, to a transducer driver 13 and to a diode bridge 15. In the example given of a piezoelectric transducer, the driver 13 would be arranged to supply an electric signal to the transducer 9 to produce the acoustic waves in the tablet medium 1. The driver 13 is periodically triggered by an output signal from a free-running rate clock 17.

The diode bridge 15 is used to isolate a pulse detector 19 from the signal line 11 during the time that the energizing signal for the transducer 9 is being applied thereto by the driver 13. The pulse detector 19 may be any suitable threshold detector capable of detecting successive input signals exceeding a predetermined amplitude and producing an individual output signal representative of each such input signal. The output signals from the pulse detector 19 are applied to a two-count counter 21 which produces a separate output signal on corresponding output lines 23, 24 for each input signal being counted up to a maximum of two counts. Specifically, the output signal on line 23 is representative of a "one" count and that on line 24 of a "two" count. These output signals are applied to the converter system as hereinafter set forth. Further, the "two" count signal on line 24 may be applied to an output terminal 26 as a synchronozing signal representative of the completion of a conversion operation.

The output signal from the driver 13 is also applied to a signal-shaping delay circuit 28. The output signal from the delay 28 is a stretched pulse having a predetermined duration which pulse is applied to the diode bridge 15 to produce a signal conductive state of the diode bridge 15. Further, the output signal from the driver 13 is applied to a "set" input of a flip-flop 30. The "1" output circuit of the flip-flop 30 is connected to a first gate 32 to supply a control signal for the gate 32. A master clock 33 is connected to the input circuit of the gate 32. The output circuit of the gate 32 is connected to the input of a Y counter 35 and the input of a second gate 37. The output of the gate 37 is connected to the input of an X counter 39. The Y and X counters 35 and 39 may be any suitable counters capable of counting input pulses and storing the total count before being reset by an externally applied signal.

A "reset" signal for the two-count counter 21 and the Y and X counters 35 and 39 is obtained from the output signal of the driver 13. The "two" count output signal from the counter 21 on line 24 is applied to the "reset" circuit of the flip-flop 30. The "one" count output signal from the counter 21 is applied to an inverter circuit 41. The output signal from the inverter 41 is applied as a gate control signal to the gate 37.

Figure 2:
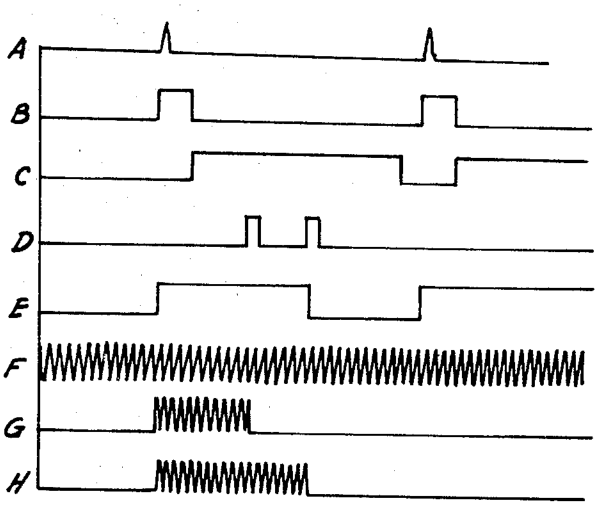
FIGURE 2 is a timing diagram for the system shown in FIGURE 1.

In operation, the illustrated embodiment of the invention is operative to produce a stored count in the Y and X counters 35 and 39 which is representative of the instantaneous Y and X coordinates of the transducer 9 on the writing area 5. The pulse rate from the clock 17 is selected to produce a desired sampling rate of the transducer position, which rate is compatible with an average writing speed of an operator manipulating the pen 7, e.g., 100 hertz. In this example of a sampling rate, the driver 13 would be actuated every one-hundredth of a second to produce a driving signal for the transducer 9. Referring now to FIGURE 2, the clock rate for the clock 17 is shown at A while the output signal for the driver 13 is shown at B. The energization of the transducer 9 produces an omnidirectional acoustic wave in the tablet medium 1. When this wave reaches the absorbing edge surfaces 2 of the tablet 1, it is absorbed. On the other hand, this wave is reflected from both of the reflecting surfaces 3. Since any point on the writing area 5 is further from the reflecting surface 3 in the Y direction than in the X direction, the reflected X direction wave reaches the transducer 9 before the reflected Y direction wave. It is to be noted that only the portion of the reflected wave normal to each of the reflecting surfaces 3 is effective to activate the transducer 9 while the remainder of the reflected wave is distributed through the medium and ultimately absorbed by the absorbing edges 2. Further, any random reflected wave which might activate the transducer 9 would be attenuated below the threshold level of the detector 19.

The output signal from the driver 13 is delayed and stretched by delay 28 and is, subsequently, applied as an energizing signal to the diode bridge 15. This delayed driver signal is shown at C in FIGURE 2. Thus, the delayed signal from the driver 13 is effective to place the bridge 15 into a conductive state for a predetermined period of time to await the arrival of the output signals from the transducer 9 representative of the reflected waves in the tablet 1.

Concurrently, the output signal from the driver 13 is applied to the flip-flop 30 to "set" the flip-flop 30 into the "1" state. The operating state of the flip-flop 30 is shown at "E" in FIGURE 2. The "1" output level from the flip-flop 30 is applied to the gate 32 to place this gate into a conducting, or open, state. When the gate 32 is opened, the output signals from the clock 33 are passed therethrough. The rate of the master clock 33 is arranged to be at a frequency which will produce a count in the counters 35 and 39 representative of the required accuracy in the measurement of the X and Y coordinates, e.g., one mHz. The output from the clock 33 is shown at F in FIGURE 2.

The output signals from the clock 33 are applied directly to the Y counter 35 and to the gate 37. The gate 37 is normally open since the "one" count output signal from the counter 21 is first applied to an inverter 41, and the output of the inverter 41 is effective to open the gate 37 when the "one" count signal is missing and vice versa. Thus, both of the counters 35 and 39 are supplied with the clock pulses from the clock 33 from the time that the gate 32 is opened by the "1" output signal from the flip-flop 30. This operating state of the counters 35 and 39 is shown at G and H in FIGURE 2.

When the first, or X, output signal from the transducer 9 is detected by the detector 19, the "two" count counter 21 is supplied with a first input pulse to be counted. This count produces an output signal on the "one" count output line 23 representative of a "one" count. This output signal is applied to the inverter 41. The output signal from the inverter 41 is now operative to close the gate 37. Thus, the counting operation of the X counter 39 is terminated. Subsequently, the Y output signal from the transducer 9 is passed by the bridge 15 to the detector 19 to produce a second pulse to be counted by the counter 21. The "two" count state of the counter 21 produces an output signal on the "two" count output line 24 which is applied to the output terminal 26 and to the "reset" terminal of the flip-flop 30. The flip-flop 30 is now reset, which state returns the "1" output level to a level which closes the gate 32.

The closing of gate 32 is effective to cut off the pulses from the clock 33 to the Y counter 35. The count stored in the counters 35 and 39 at this time is representative of the sampled Y and X coordinates of the transducer 9. Of course, the stored count of each counter is normally double the actual corresponding coordinate since a round trip was made, but a conversion can conveniently be performed by simply dividing the stored counts in half. Another method of obtaining a count representation of the actual coordinates is to select the frequency of the master clock 33 to be one-half of the speed of sound in the tablet medium 1, e.g., for coordinates in millimeters, the frequency is selected to be one hertz for each two millimeter sound travel. Further, stored counts would normally include the travel time of the wave over the fixed spacing of the area 5 from the walls 3, which time can be excluded from the final count by presetting counters 35 and 39 to a "negative" number, whereby a predetermined number of pulses from the clock 33 corresponding to this fixed distance are counted before commencing the "positive" count of the actual X and Y coordinates.

When the driver 13 is triggered again by the clock 17, the output signal from the driver 13 is applied as a "reset" signal to the counters 21, 35 and 39 concurrently with the setting of the flip-flop 30. Thus, the system is reset to initiate a new coordinate conversion operation in a manner as described above. It is to be noted that, while two clocks 17 and 33 have been shown for convenience of illustration, one clock could be used with one clock output signal being a submultiple of the other.

What is claimed is:

1. A coordinate converter system comprising a tablet medium, signal transmitting and receiving means operative to induce periodic signals into said tablet and to receive signals reflected in said tablet, a clock for providing a train of successive signals, first counter means arranged to count said signals from said clock, second counting means arranged to count said signals from said clock, and means responsive to said transmitting and receiving means to terminate the operation of said first counter upon the detection of a first received signal and to terminate the operation of said second counter upon the detection of a second received signal.

2. A coordinate converter system as set forth in claim 1, wherein said tablet includes two adjacent signal reflecting boundaries with the remainder of the tablet boundary being of a signal absorbing type.

3. A coordinate converter system as set forth in claim 2, wherein said two adjacent boundaries are mutually perpendicular and said first received signal is a signal reflection from one of said two boundaries and said second received signal is a signal reflection from the other one of said two boundaries.

4. A coordinate converter system as set forth in claim 1, wherein said signal transmitting and receiving means includes a second clock, a signal driver responsive to said second clock and a transducer responsive to said driver to produce acoustic waves in said tablet medium.

5. A coordinate converter system as set forth in claim 4, wherein said second clock has a frequency which is a submultiple of the frequency of said train of successive signals.

6. A coordinate converter as set forth in claim 3, wherein said tablet includes a writing area having any point thereon spaced a greater distance from one of said reflecting boundaries than from the other one of said boundaries.

References Cited

UNITED STATES PATENTS 3,134,099 5/1964 Woo -------------- 340—347

RICHARD A. FARLEY, *Primary Examiner.*

U.S. Cl. X.R.

235—154; 340—347